(12) United States Patent
Shizuya et al.

(10) Patent No.: US 8,136,128 B2
(45) Date of Patent: Mar. 13, 2012

(54) OPTICAL DISC APPARATUS

(75) Inventors: Mitsutaka Shizuya, Ryugasaki (JP); Shinya Tsubota, Mito (JP); Hiroshi Yamagishi, Chiba (JP); Sojiro Kirihara, Kawasaki (JP)

(73) Assignees: Hitachi Consumer Electronics Co., Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 318 days.

(21) Appl. No.: 12/508,819

(22) Filed: Jul. 24, 2009

(65) Prior Publication Data

US 2010/0023957 A1 Jan. 28, 2010

(30) Foreign Application Priority Data

Jul. 24, 2008 (JP) .................................. 2008-191362

(51) Int. Cl.
*G11B 17/04* (2006.01)
(52) U.S. Cl. ...................................... 720/603
(58) Field of Classification Search .................. 720/603, 720/649, 613, 616, 606, 601, 614, 651, 734, 720/730
See application file for complete search history.

(56) References Cited

U.S. PATENT DOCUMENTS

2010/0058370 A1* 3/2010 Amitani ........................ 720/601
2010/0223634 A1* 9/2010 Fujimoto et al. .............. 720/601

FOREIGN PATENT DOCUMENTS

| JP | 2005-092919 | 4/2005 |
| JP | 3788888 | 4/2006 |
| JP | 2006-309906 | 11/2006 |

* cited by examiner

*Primary Examiner* — Allen Cao
(74) *Attorney, Agent, or Firm* — Antonelli, Terry, Stout & Kraus, LLP.

(57) ABSTRACT

An optical disc apparatus for enabling reduction of fluid noises accompanying with disc rotation, effectively, comprises a tray 5 provided to be able to comes in/out into/from said housing freely, a unit mechanism 5 provided together with the tray, in one body, a turntable 9a provided on the unit mechanism and configured to support a disc thereon, to be rotatable freely, a plural number of wall portions 5b to 5d formed on the tray surrounding the disc supported on the turntable from an outer periphery thereof, each of which has configuration like an arc around a rotation center of the turntable, a pickup 10 for doing straight-line motion within along a radius direction of a disc 4, and an opening 56, which is provided on the wall portion 5e locating at the position on the moving track of the pickup, for maintaining movement of the pickup, wherein the wall portion 5e is moved or stepped back to a side of an outer periphery of the turntable comparing to other wall portions.

6 Claims, 8 Drawing Sheets

LEFT (LEFT SIDE-SURFACE)

FRONT (FRONT SURFACE) ←↕→ REAR (REAR SURFACE)

RIGHT (RIGHT SIDE-SURFACE)

LEFT (LEFT SIDE-SURFACE)   REAR (REAR SURFACE)

FRONT (FRONT SURFACE)   RIGHT (RIGHT SIDE-SURFACE)

LEFT (LEFT SIDE-SURFACE)

FRONT (FRONT SURFACE) ←→ REAR (REAR SURFACE)

RIGHT (RIGHT SIDE-SURFACE)

LEFT (LEFT SIDE-SURFACE)

FRONT (FRONT SURFACE) ←→ REAR (REAR SURFACE)

RIGHT (RIGHT SIDE-SURFACE)

LEFT (LEFT SIDE-SURFACE)

FRONT (FRONT SURFACE) ↔ REAR (REAR SURFACE)

RIGHT (RIGHT SIDE-SURFACE)

FRONT (FRONT SURFACE) ◄——► REAR (REAR SURFACE)

OPTICAL DISC APPARATUS

BACKGROUND OF THE INVENTION

The present invention relates to an optical disc apparatus for recording/reproducing information onto/from an optical disc.

An optical disc apparatus is for recording/reproducing information onto/from an optical disc (being about 120 mm in the diameter thereof), such as, a CD (Compact Disc), a DVD (a Digital Versatile Disc) and a BD (Blu-ray Disc) or the like, and is mounted widely, not only onto personal computers, such as, a notebook type, a desk top type, and a tower type, etc, but also onto a home recording/reproducing machine, a game machine, etc. For example, within the notebook type and the desktop type personal computers, there is mainly applied a thin-shaped optical disc apparatus of a tray-type. In the optical disc apparatus of this tray-type, the main parts thereof, such as, a spindle motor and an optical pickup, etc., are mounted on a lower surface of a tray. And, it has a feature that, with the tray, those main parts also project in a front of a housing, when trying to do loading/unloading (or attaching/detaching) of an optical disc therein.

In recent years, accompanying with an increase of the recording/reproducing speed of the optical disc apparatus, the optical disc apparatuses are used at higher rotational speed of with rotating the disc at high speed. In this situation, there is a problem of an increase of noises, such as, a mechanical noise caused due to vibrations of the spindle motor and the respective parts of the apparatus, a fluid noise due to a circling airflow generated with rotation of the disc, etc., for example. The former, the mechanical noise comes to be reduced, gradually, by means of a countermeasure for suppressing the vibration, which are applied on the parts, including the spindle motor, and also contacting portions on that parts, etc. On the other hand, regarding the reduction of the later, i.e., the fluid noise, due to the restrictions on the inner structures and sizes thereof, with the thin-shaped optical disc apparatus, studies and countermeasures thereof are not sufficient so far.

As a technology for reducing the fluid noise within the thin-shaped optical disc apparatus of the tray-type, for example, there is already known that, wherein a cutoff opening(s) is/are formed for allowing an airflow caused by rotation of the disc to flow out under the tray, on either one or both of a flat portion of the tray, facing to the lower surface of the disc, and a wall surface portion disposed to surround an outer periphery of the disc (see the following Patent Document 1).
[Patent Document 1] Japanese Patent No. 3788888.

BRIEF SUMMARY OF THE INVENTION

However, with such the technology as mentioned above, since the high-speed circling airflow around the disc, as a dominant source of generation the fluid noise, is guided from upward to downward of the tray, so as to stimulate the flow to exfoliate from the lower surface of the disc, by means of the cutoff opening(s), thereby achieving the reduction of noises, i.e., in other words, it is only an indirect countermeasure for it. For that reason, comparing it with a case where the countermeasures are made, directly, upon a separation point, a junction point and an exfoliation point, etc., i.e., the remarkable noise generation sources, in particular, on a periphery of the disc, it shows a tendency that an effect of reducing the noises is restricted, in general.

Also, upon distribution of static pressures between an upper part and a lower part of the tray, which was confirmed by the inventors of the present patent application, it is found out that the static pressure comes to be high, directing from an inner periphery of the disc into an outer periphery thereof due to the circling airflow in the upper part or side of the tray, but it is almost uniform or flat in the lower part of the disc because the induced flow is less. Thus, it is found out that the difference of the statistic pressure of the lower side compared with the upper side of the tray is relatively high, in particular, within a portion starting from the inner periphery to a middle periphery of the disc, and it is relatively low within a portion of the outer periphery of the disc, as well as, the outside thereof. Accordingly, the cutoff opening(s) mentioned above, for allowing the airflow to flow out downward the tray is effective only when it/they is/are provided on the outer periphery side of the flat portion of the tray and/or the wall surface portion on the outside thereof, and therefore the effect of reducing the noises, which can be obtained actually on the entire of the lower surface of the disc, comes to be further limited much more than that, which can be expected.

An object, according to the present invention, is to provide an optical disc apparatus, for enabling reduction of the fluid noises accompanying with rotation of the disc, effectively.

According to the present invention, for accomplishing the object mentioned above, there is provided an optical disc apparatus, comprising: a housing; a tray, which is provided to be able to comes in/out into/from said housing freely; a unit mechanism, which is provided together with said tray, in one body; a turntable, which is provided on said unit mechanism and is configured to support a disc thereon, being rotatable freely; a spindle motor, which is configured to turn said turntable; a pickup, which is configured to do straight-line motion within said unit mechanism, along a radius direction of said turntable; a flat portion, which is formed on said tray, within a range facing to a lower surface of the disc being supported on said turntable; and a plural number of hill portions, which are formed on said tray, dispersedly, surrounding said flat portion, and each having a wall portion on side facing to the flat portion, so as to form an arc shape around a rotation center of said turntable, wherein an opening portion is provided, to pass said pickup passes therethrough, at least on the wall portion within said hill portion, on the side facing to said flat portion, below which said unit mechanism is disposed, among said plural number of hill portions, and at least a part of the wall portion, on which said opening is provided, is moved or stepped back to an outer periphery side of said turntable, comparing to said wall portion of the other hill portion(s).

With such the optical disc apparatus as was mentioned above, according to the present invention, it is possible to reduce the fluid noises accompanying with rotation of the disc, effectively.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained by referring to the attached drawings.

Figure 1:
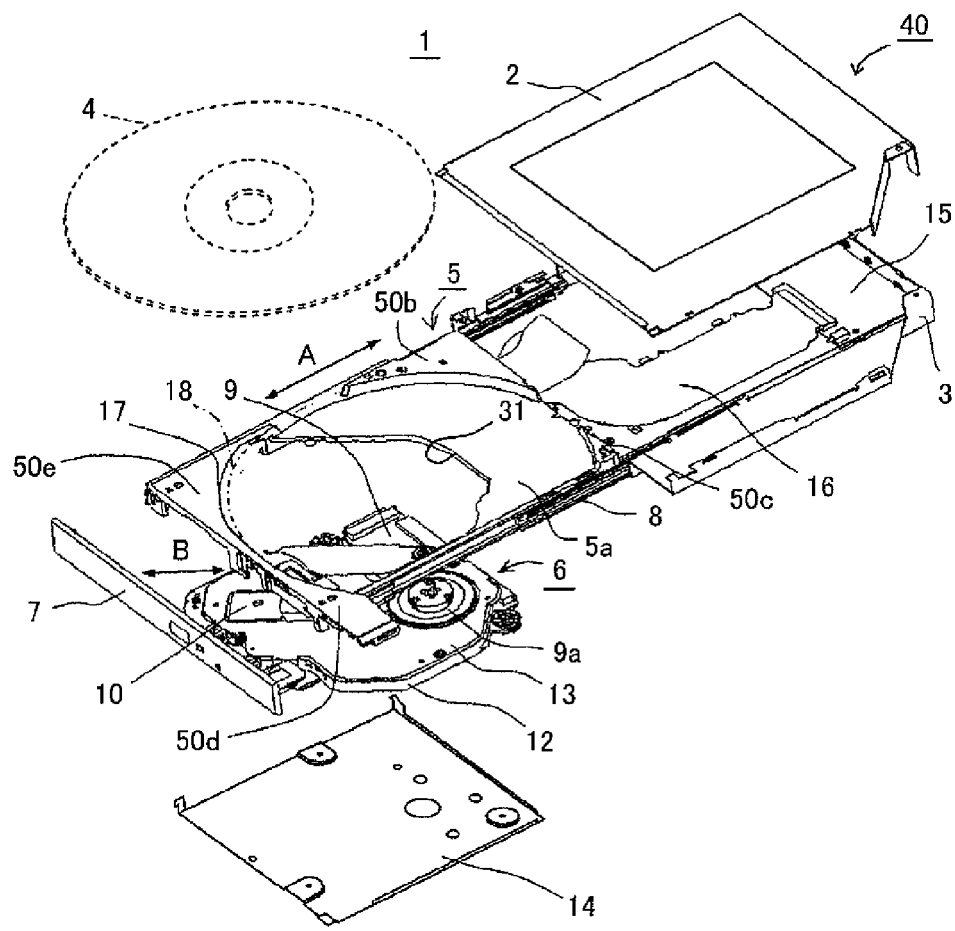
FIG. 1 is an exploded perspective view of an optical disc apparatus, according to a first embodiment of the present invention, for showing an outline structure thereof.
Figure 2:
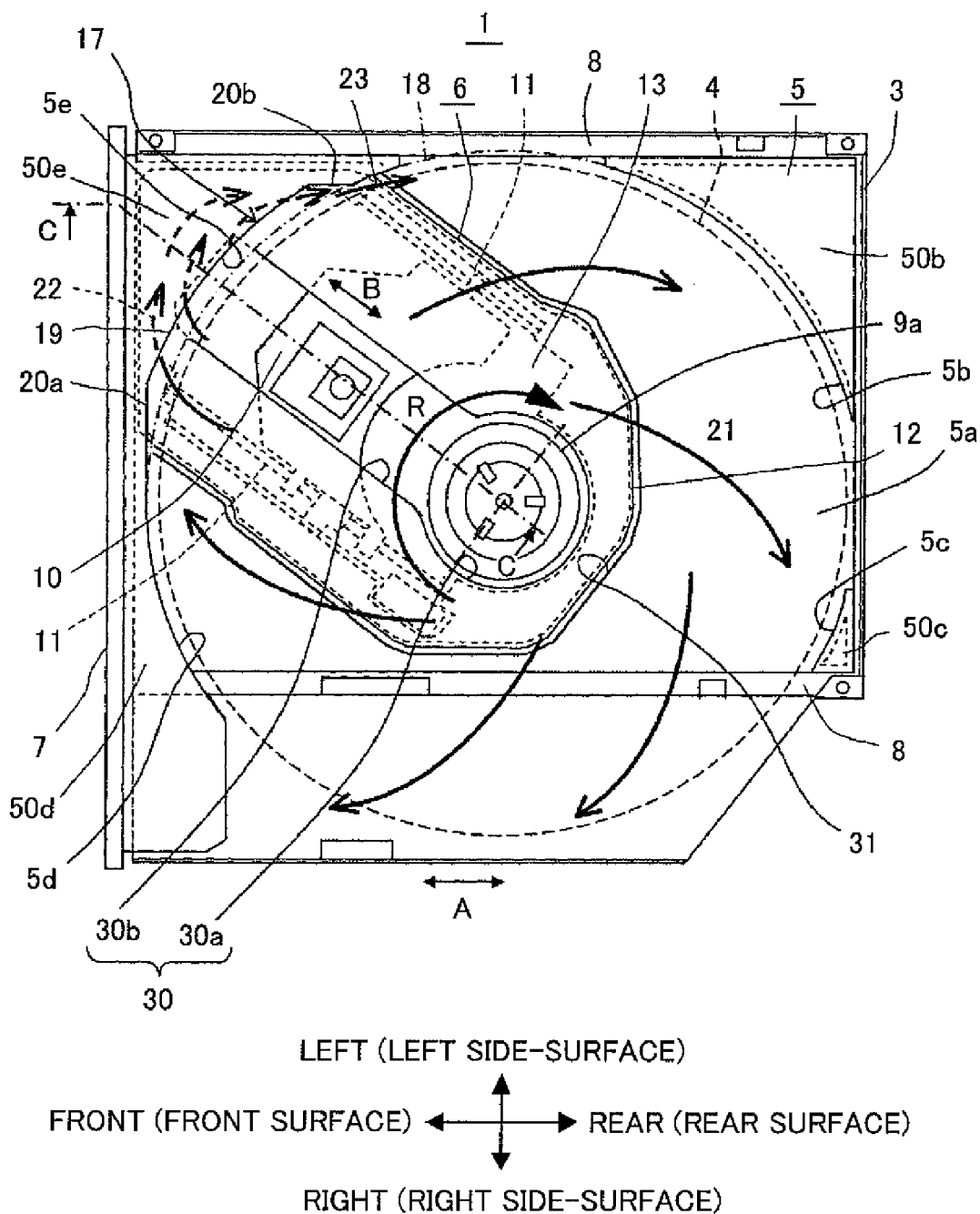
FIG. 2 is a plane view of the optical disc apparatus, according to the first embodiment of the present invention, but removing a top cover thereof.
Figure 3:
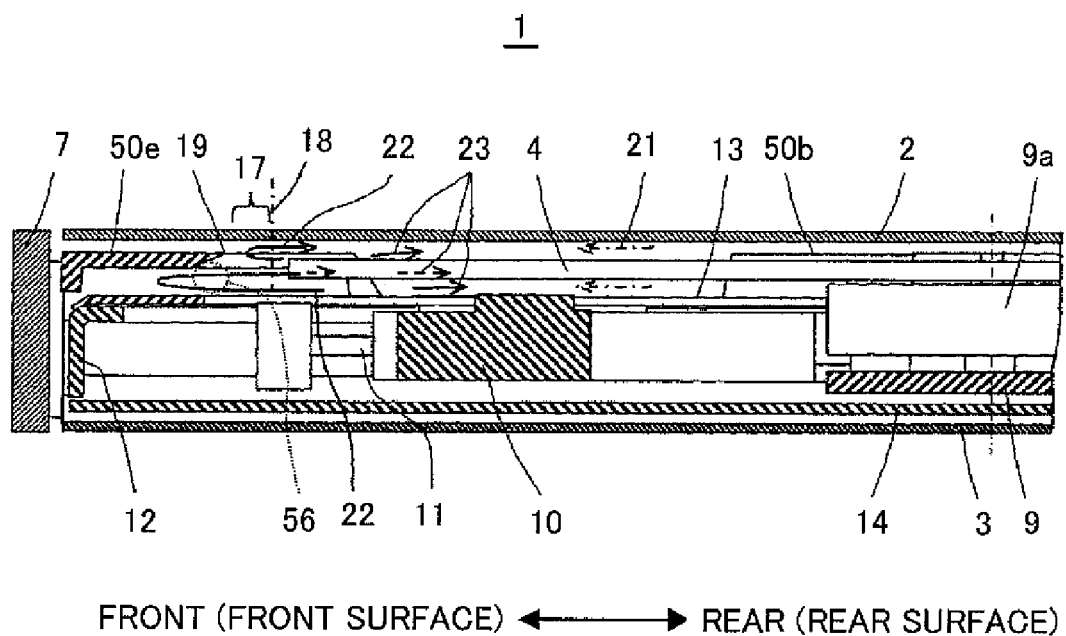
FIG. 3 is a partial cross-section view along with a line C-C shown in FIG. 2 mentioned above.

FIG. 1 is an exploded perspective view of an optical disc apparatus, according to a first embodiment of the present invention, for showing an outline structure thereof, FIG. 2 is a plane view of the optical disc apparatus, according to the first embodiment of the present invention, but removing a top cover thereof, and FIG. 3 is a partial cross-section view along with a line C-C shown in FIG. 2 mentioned above. Hereinafter, as is shown by arrows in each of the drawings, a part of the optical disc apparatus 1 on side of a front panel 7 may be called "front (front surface)", while on side of a circuit board 15 "depth or rear surface", and at the right-hand side directing from the front surface to the rear surface may be called "right (right side-surface)", and at the left-hand side directing from the front surface to the rear surface "left (left side-surface)", respectively.

The optical disc apparatus 1 shown in those figures comprises a housing 40, a tray 5 and a unit mechanism 6. The optical disc apparatus 1 is of a thin-shaped, which is applied into personal computers, mainly a notebook type and a desktop type, and is for conducting recording/reproducing on an optical disc (or, only a disc) 4 of about 120 mm in the diameter thereof.

The housing 40 is in a box-like shape, for storing therein the parts constructing the optical disc apparatus 1 therewith, and has a top case 2 and a bottom case 3, for defining an upper and a lower surfaces, a right and a left side-surfaces, and a rear surface of the optical disc apparatus 1. Within the housing 40 are received, mainly, the tray 5, the unit mechanism 6 and the circuit board 15. The circuit board 15 is connected with the unit mechanism 6, which is attached on the tray 5, through a flexible printed circuit board 16, and thereby transmitting information for controlling processes and signal processing between the unit mechanism 6.

The tray 5 is attached onto the housing 40 through guide rails 8, which are provided on both side surfaces thereof, and is able to slide into forward/backward directions, as shown by arrows A (see FIG. 1, etc.) by means of the guide rails 8, thereby freely comes out from the housing 40. Such structure is called a "tray" type. The front panel 7, being a front surface of the optical disc apparatus 1, is attached on a front surface side of the tray 5. Also, the tray 5 has a flat portion 5a facing to the reverse surface of the disc 4, which will be mounted on a turntable 9a (will be mentioned later), and elevation or hill portions 50b, 50c, 50d and 50e, which are formed separately surrounding an outer periphery of the flat portion 5a.

In part of the flat portion 5a is provided a cutoff portion 31, at which the mechanical unit 6 should be attached. The cutoff portion 31, according to the present embodiment, is provided directing from a central portion of the tray 5 to the front side of the left side surface. The unit mechanism 6 is fixed on the tray 5 from a lower side through the cutoff portion 31.

The unit mechanism 6 comprises a mechanical chassis 12, as a body thereof, a unit cover 13 for covering an upper surface of the mechanical chassis 12, an under cover 14 covering the mechanical chassis 12 from a lower surface thereof, thereby for supporting thereof, the turntable 9a for supporting the disc 4 to be freely rotatable, a spindle motor 9 (see FIG. 3) for rotating the turntable 9a into a disc rotation direction "R" (i.e., the clockwise direction while seeing the apparatus from the above thereof), and a pickup having a laser and a laser driver IC, etc., for conducting recording/reproducing of information of the disc 4.

The unit cover 13 is positioned at height almost equal to that of the flat portion 5a of the tray 5, and defines a plane together with the flat portion 5a. On the unit cover 13 is formed a central opening 30 (see FIG. 2) for exposing or brining the central portion of the pickup 10, at which an optical lens or the like is provided, and also the turntable 9a, into an outside. The central opening 30 is made up with a circular opening portion 30a, which is provided for the turntable 9a, and a square or rectangular opening portion 30b, which is provided for the pickup 10. The rectangular opening portion 30b is provided along with a radius direction "B" (i.e., the radius direction of the disc 4) of the turntable 9a, i.e., a moving track of the pickup 10, and defines the central opening 30, together with the circular opening portion 30a, as a unit.

The pickup 10 is attached onto a pair of guide bars 11 (see FIG. 2), which are disposed facing to each other at a predetermined distance within the unit mechanism 6, and it moves on the moving track defined by this pair of guide bars 11 along with the radius direction "B" of the turntable 9a. The pickup 10 conducts transmission of information between the rotating disc 4 through a laser light, while moving on the guide bars 11.

Each of the hill portions 50b, 50c, 50d and 50e of the tray 5 is a convex-like portion projecting to be high near to the disc 4 than the flat portion 5a, and they are formed at four (4) corners and a front of the tray 5 so that they surround the flat portion 5a. The hill portion 50b is located at the rear of the left-hand side of the tray 5, and has an arc-like wall portion (left-rear side wall portion) 5b, on the side of the flat portion 5a (on the side of the disc 4). The hill portion 50c is located at the rear of the right-hand surface of the tray 5, and has a wall portion (right-rear side wall portion) 5c formed in the arc-like shape, on the side of the flat portion 5a, in the similar manner to the wall portion 5b. The hill portion 50d is located at a front side of the right-hand side surface of the tray 5, and has a wall portion (right-front side wall portion) 5d formed in the arc-like shape, on the side of the flat portion 5a, in the similar manner to the wall portion 5b. The wall portions 5b, 5c and 5d form an arc of a concentric circle around the rotation center of the turntable 9a, respectively, and are formed on a same circumference of a circle (i.e., on a line 18 of inner diameter). Thus, the wall portions 5b, 5c and 5d are disposed on the tray so that they are surrounding the disc 4 from an outer periphery thereof.

On the other hand, the hill portion 50e, being formed on the front side of the left-hand side surface of the tray 5, has a wall portion (a front-side roof-like wall portion) 5e, which is provided on the side of the flat portion 5a. Below the hill portion 50e are located the unit mechanism 6 fixed at the cutoff portion 31 and the rectangular opening portion 30b of the central opening 30. Thus, within the hill portion 50e is received an outer periphery portion of the unit mechanism 6 (i.e., a portion extending to an outside of the disc 4, so as to move the pickup 10 up to the outer periphery portion of the disc 4), and the wall portion 5e is provided on the moving track of the pickup 10. For that reason, on the wall portion 5e is provided an opening portion 56, through which the pickup 10 can pass. The opening portion 56 is a portion, being formed by cutting off the wall portion 5e from the upper surface of the unit mechanism 6 up to a predetermined height, and is continuous with the cutoff portion 31. The cross-section configuration of the wall portion 5e, according to the present embodiment, is in the roof-like shape on the side of the disc 4, as is shown in FIG. 3, i.e., it is formed so that the distance between the wall portion 5e and the unit mechanism 6 (i.e., the opening portion 56) can be as large as possible.

A part of the wall portion 5e (i.e., an enlarged diameter cutoff portion 17) is moved or stepped back to an outside (to an outer periphery side) of the turntable 9a in the diameter direction, comparing to the line 18 of inner diameter on which the other wall portions are located. The enlarged diameter cutoff portion 17, according to the present embodiment, is defined by an arc portion 19 locating at the center of the wall portion 5e, and straight-line portions 20a and 20b connecting with the line 18 of inner diameter directing thereto, by a straight line, on both sides of the arc portion 19. Thus, the enlarged diameter cutoff portion 17, according to the present embodiment, is formed to be nearly symmetric, upon basis of the central portion of the arc portion 19 in the periphery direction thereof. Herein, between the straight-line portions 20a and 20b, it is assumed that one of the circling airflows 21 generating due to rotation of the disc 4 locating in an upstream side of the flow of is the upstream-side straight-line portion 21a while the other locating in a downstream side thereof is the downstream-side straight-line portion 20b.

Within the optical disc apparatus 1 being constructed as was mentioned above, when the disc 4 is rotated by means of the spindle motor 9, as is shown in FIGS. 2 and 3, the circling airflows 21 are generated along with the upper and lower surfaces of the disc 4. With this, in vicinity of the wall portion 5e, a slip-in flow 22 flowing into an inside of the hill portion 50e through an opening 56 from an outer edge of the disc 4 is generated in the upstream side of the circling airflows 21, and also a leak-out flow 23 flowing outside from the inside of the hill portion 50e through the opening portion 56 is formed in the downstream side of the circling airflows 21. The slip-in flow 22 flows into the hill portion 50e within a range, from the upstream-side straight-line portion 21a of the wall portion 5e up to a center of the arc portion 19 or to a downstream side, slightly, and almost thereof flows out, from the downstream side than a center of the arc portion 19 or from the downstream-side straight-line portion 20b, as a leakage-out flow 23, after passing through between the hill portion 50e and the unit cover 13.

Herein, when it is assumed that a gap between the outer edge of the disc 4 and the wall portion 5e is narrow, similar to the gaps between the other wall surfaces 5b, 5c and 5d, then the slip-in flow 22 and the leak-out flow 23 are concentrated within an area defined between the disc 4 and the wall portion 5e, therefore great fluid noises can be generated. For example, such concentrated flow collides upon the disc 4, in this manner, the disc 4 vibrates, and this may be a factor of generating the fluid noises. In particular, on the wall portion 5e is provided the opening portion 56, and due to this, since the slip-in flow 22 and the leak-out flow 23 are generated, with ease; therefore, great noises can be generated, due to the concentration of the flows, comparing to the other wall portions 5b, 5c and 5d.

On the contrary to this, on the wall portion 5e of the present embodiment, there is provided the enlarged diameter cutoff portion 17, and the gap between the outer edge of the disc 4 and the wall portion 5e is reduced, gently, directing from the arc portion 19 to the straight-line portion 20b, after expanding gently or gradually directing from the straight-line portion 20a to the arc portion 19. Widening the distance (i.e. the gap) between the outer edge of the disc 4 and the wall portion 5e, in this manner, brings the slip-in flow 22 and the leak-out flow 23 to escape into portions other than the disc 4, comparing to the case where that distance is narrow, and therefore it is possible to reduce the concentration of flows, as well as, an interference between the disc 4. With this, since disturbance of the flows is reduced in the periphery of the wall portion 5e, it is also possible to reduce the fluid noises caused due to the disturbance of the flows.

By the way, in general, the flow such as the slip-in flow 22 flowing into the hill portion 50e has a tendency of becoming into the leak-out flow 23 after being biased to the left-hand side surface of the housing 40. For this reason, the noises in the gap between the wall portion 5e and the outer edge of the disc 4 has a tendency of generating, easily on the side of the leak-out flow 23, i.e., in the downstream side than the upstream side. Accordingly, for the purpose of reducing the noises in vicinity of the wall portion 5e, effectively, it is preferable to form the enlarged diameter cutoff portion 17, while moving or stepping back the portion where the leak-out flow 23 comes out from the hill portion 50e, i.e., the portion at the downstream side of the wall portion 5e in the peripheral direction (e.g., the downstream side in the rotating direction of the turntable 9a). In the present embodiment, since the gaps are enlarged, not only the downstream side of the wall portion 5e in the peripheral direction, but also within the all the areas from the upstream to the downstream, it is possible to reduce also the fluid noises generated due to the slip-in flow 22 in the upstream, as well as, the leak-out flow 23 in the downstream where the fluid noises can generate easily, though contribution to the reduction of noises is smaller than that in the downstream, and therefore it is effective.

As was mentioned above, with the optical disc apparatus according to the present embodiment, since it is possible to reduce the concentration of circling airflows, being the remarkable source of the noises, directly, and therefore it is possible to reduce the fluid noises accompanying with the disc rotation, effectively.

Next, explanation will be made on a second embodiment of the present invention.

Figure 4:
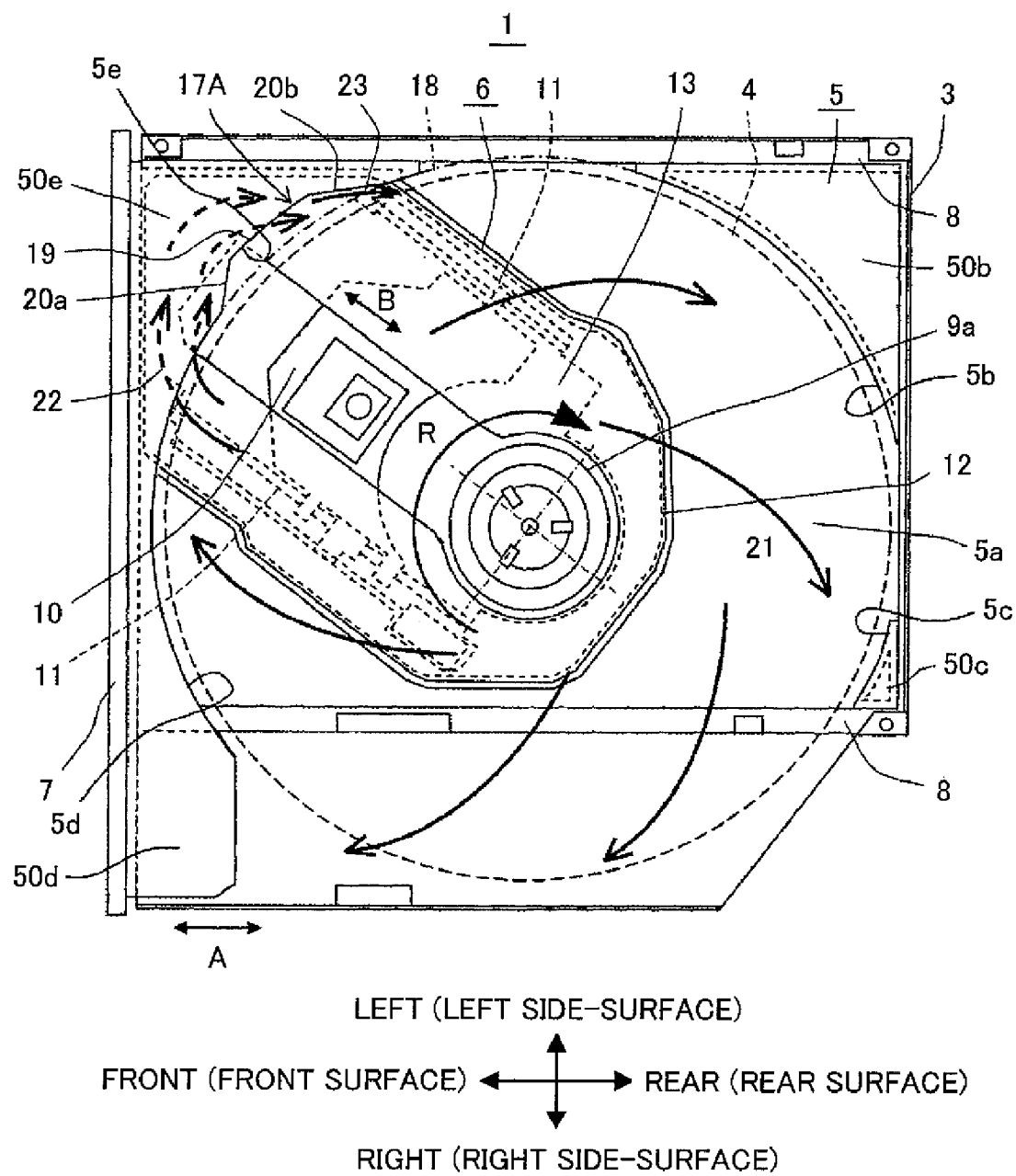
FIG. 4 is a plane view of the optical disc apparatus, according to a second embodiment of the present invention, but removing a top cover thereof.

FIG. 4 is a plane view of the optical disc apparatus, according to the second embodiment of the present invention, while removing a top cover therefrom. However, the same reference numerals are attached to the portions, which are similar to those shown in the figures mentioned above, and the explanations thereof will be omitted (being same to the figures which will be mentioned later).

The optical disc apparatus shown in this figure differs from the first embodiment in an aspect that it comprises an enlarged-diameter cutoff portion 17A on the wall portion 5e. The enlarged-diameter cutoff portion 17A is provided near to the left-hand side surface of the housing 40, from vicinity of a center of the wall portion 5e, in the peripheral direction thereof (i.e., near to the downstream side in the rotating direction of the turntable 9a (or disc 4).

With provision of the enlarged-diameter cutoff portion 17A in this manner, the gap defined between the outer edge of the disc 4 and the wall surface portion 5e is narrow, also similar to those defined between the other wall portions 5b, 5c and 5d, in the upstream portion upper than the straight-line portion 20a, but it can be widen in an area or range starting from the straight-line portion 20a, up to the arc portion 19, and to the downstream-side straight-line portion 20b. With this, within the vicinity of the flow-in portion of the slip-in flow 22, though not so much as according to the first embodiment, but since the concentration of flows and the interference with the outer edge of the disc 4 can be reduced down to a certain level or degree, comparing with the case where the gap is narrow, it is possible to reduce the fluid noises caused due to the disturbance of flow. Also, in the vicinity of flow-out portion of the leak-out flow 23, since the concentration of flows and the interference with the outer edge of the disc 4 can be reduced down to the level or degree, being similar to that in the first embodiment, it is possible to reduce the fluid noises caused due to the disturbance of flow. By the way, as was already mentioned in the above, the noise within the gap defined between the wall portion 5e and the outer edge of the disc 4 has a tendency of being generated easily by the leak-out flow 23 in the downstream side. Accordingly, in accordance with the present embodiment, though being inferior a little bit in the effect in the upstream side, comparing to the first embodiment, but it is possible to suppress the fluid noises in both the upstream side and the downstream side of the wall portion 5e in the peripheral direction thereof. Thus, with provision of such enlarged-diameter cutoff portion 17A as the present embodiment, it is also possible to reduce the fluid noises accompanying with the disc rotation, effectively.

Next, explanation will be made on a third embodiment according to the present invention.

Figure 5:
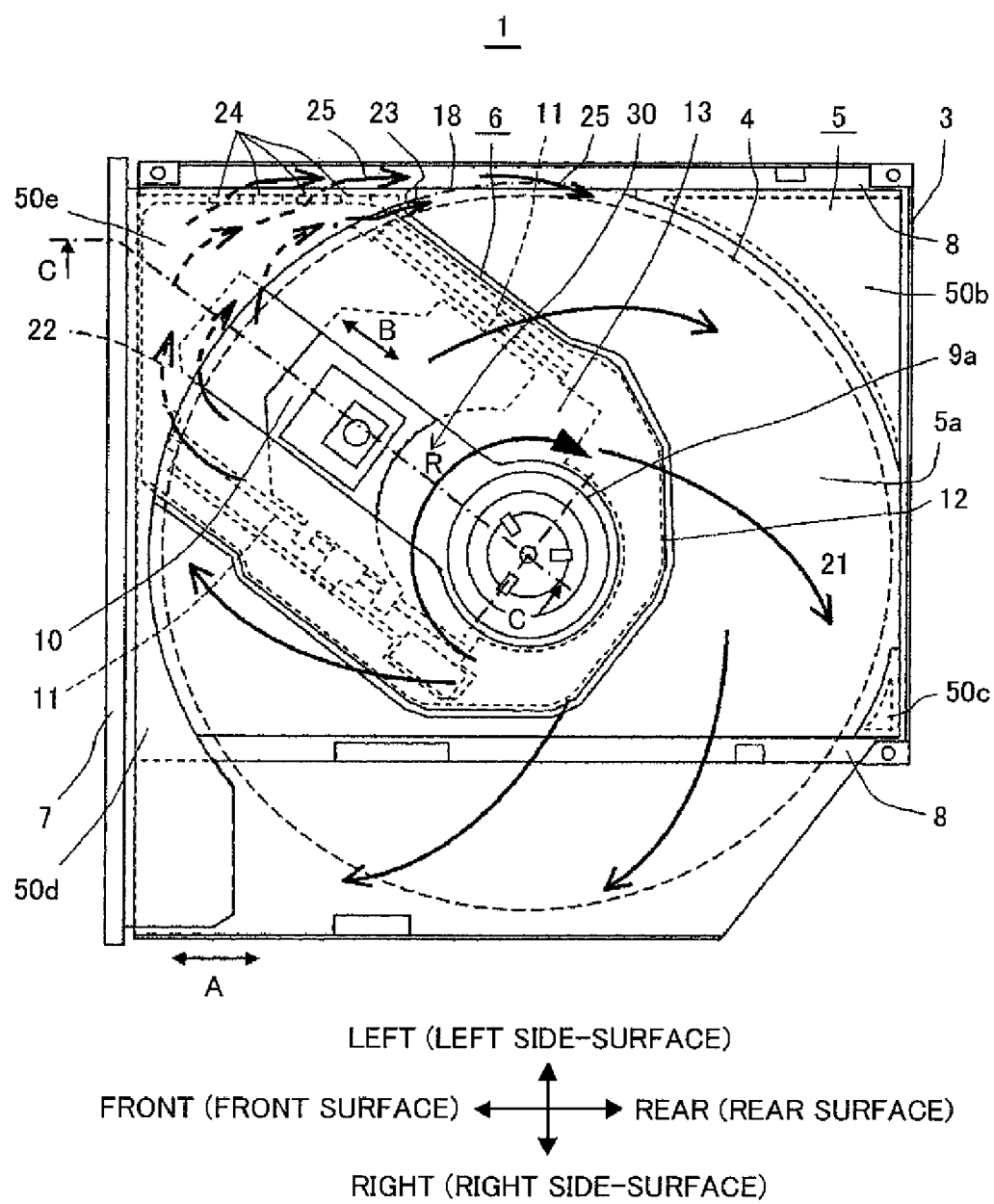
FIG. 5 is a plane view of the optical disc apparatus, according to a third embodiment of the present invention, but removing a top cover thereof.
Figure 6:
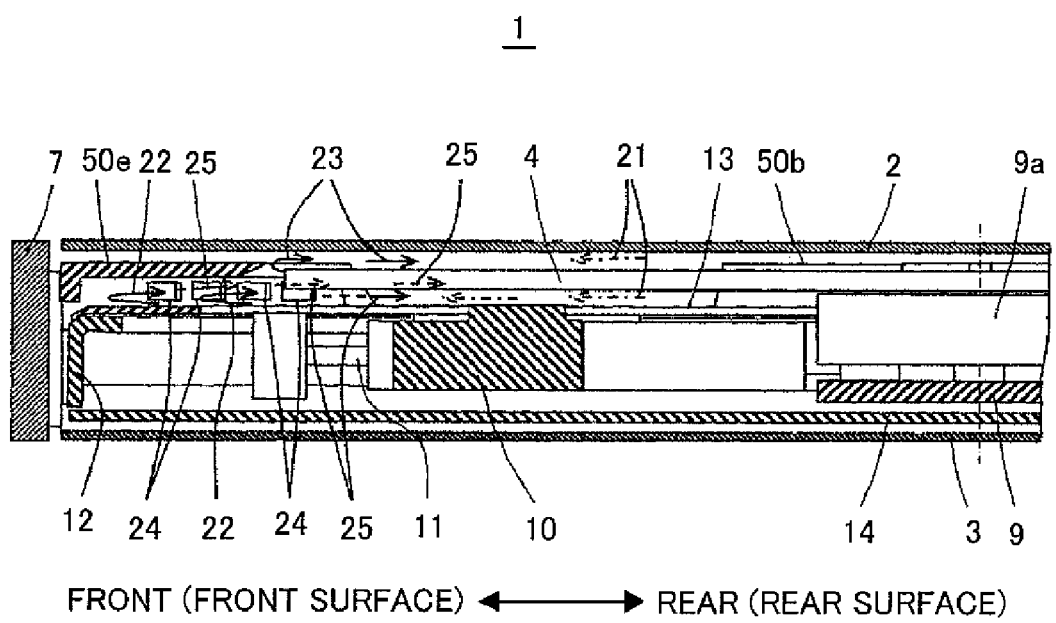
FIG. 6 is a partial cross-section view along with a line C-C shown in FIG. 5 mentioned above.

FIG. 5 is a plane view of the optical disc apparatus, according to the third embodiment of the present invention, while removing a top cover therefrom. FIG. 6 is a partial cross-section view along with a line C-C shown in FIG. 5.

The optical disc apparatus shown in those figures differs from those embodiments mentioned previously, in an aspect that it has a plural number of bypass openings 24 in a front of the tray 5 on the left-hand side surface thereof, at which the hill portion 50e is located. Each bypass opening 24 is for discharging a part of the slip-in flow 22, which is guided through the opening portion 56, to an outside of the tray 5, and is provided on the left-hand side surface of the hill portion 50e. The bypass openings 24 is provided at the position higher than the flat portion 5a, and is communicated from the inside of the hill portion 50e to the gap, which is defined between the left side surface of the tray 5 and the left inner surface of the housing 40 (thus, corresponding to an upper of the guide rails 8 and so on).

As was mentioned previously, the circling airflows 21 generated due to the rotation of the disc 4 flows into the inside of the hill portion 50e, as the slip-in flow 22, and that slip-in flow 22 runs out from the inside of the hill portion 50e, as the leak-out flow 23. Herein, if providing the bypass openings 24 mentioned above on the side surface of the wall portion 5e, since much of the flow running into the hill portion 50e and passing through the gap between the unit cover 13 comes into a bypass flow 25, which passes through the bypass openings 24 and runs into the gap on the side surface of the tray 4, then the leak-out flow 23 comes to be less, which flows out from the hill portion 50e. In this instance, since the bypass flow 25 joins with the flows on the outer edge of the disc 4, in a wide range thereof, after passing through the gap between the housing 40 and the tray 5, through the gap between the hill portion 50e and the hill portion 50b, etc., it is turned back to the side of the disc 4, but not being concentrated, locally. On the other hand, since the leak-out flow 23 from the hill portion 50e is reduced in an amount or volume of flowing thereof by that of the bypass flow 25, then it is reduced comparing with the case where there is no bypass opening 24. With this, since the disturbance of the flows is reduced, being generated when the leak-out flow 23 joins with the flows on the outer edge of the disc 4, it is possible to reduce the fluid noises caused due to the disturbance. In this manner, with the present embodiment, since the amount or volume of flowing of the leak-out flow 23 by means of the bypass openings 24 is reduced, it is possible to reduce the fluid noises accompanying with the disc rotation, effectively.

However, as was mentioned above, since much of the slip-in flow 22 is distributed, unevenly, to the downstream side in the rotating direction of the disc 4, within the hill portion 50e, then for the purpose of bypassing the slip-in flow 22 into the outside of the tray 5, effectively, it is preferable to provide the bypass openings 24 on the downstream side of the turntable 9a in the rotating direction thereof (i.e., the rotating direction of the disc 4). Also, it is preferable to provide a plural number of bypass openings 24, as large as possible, as far as the strength of the tray 5 can allow.

Next, explanation will be given on a fourth embodiment of the present invention.

Figure 7:
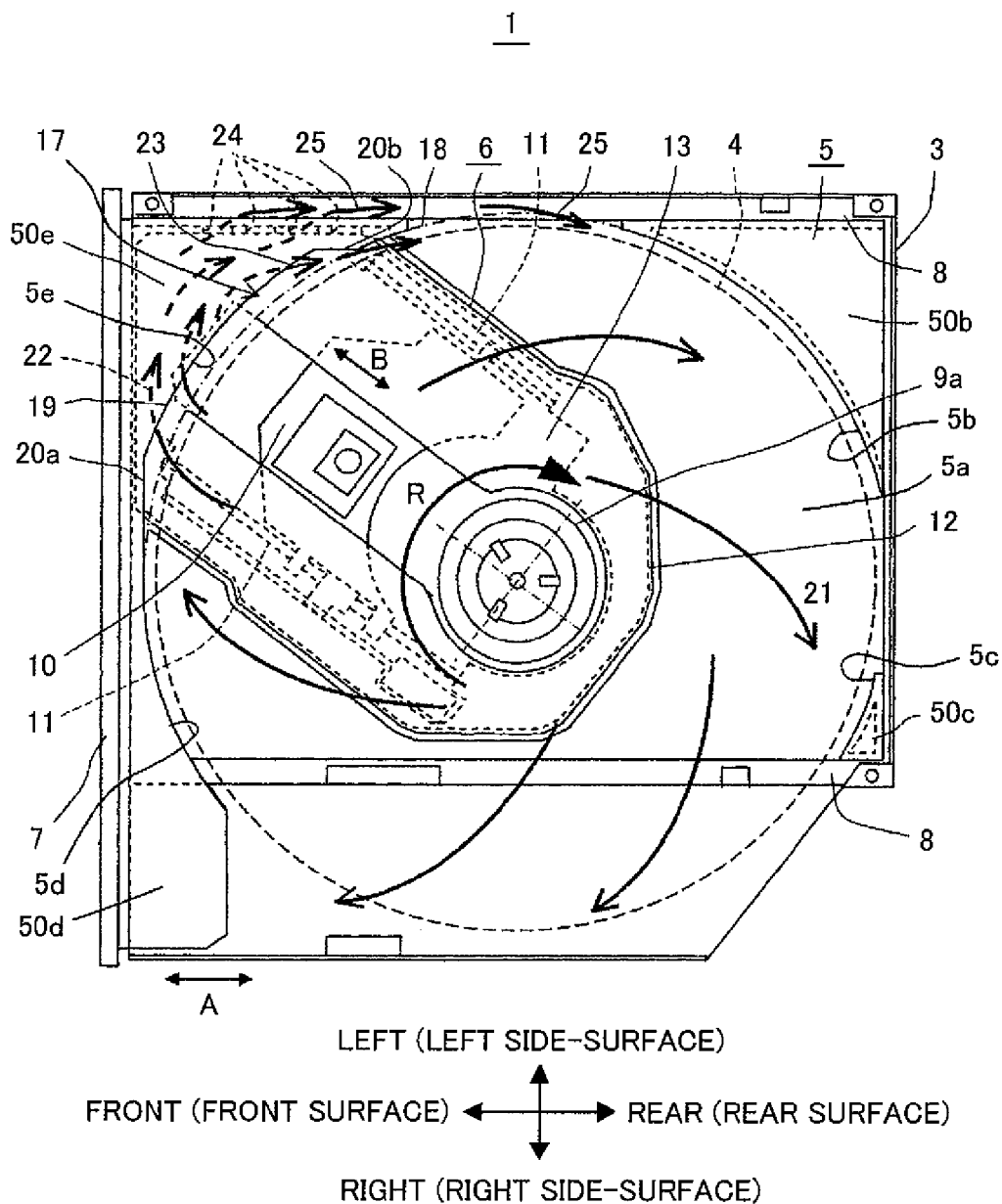
FIG. 7 is a plane view of the optical disc apparatus, according to a fourth embodiment of the present invention, but removing a top cover thereof.

FIG. 7 is a plane view of the optical disc apparatus, according to the fourth embodiment of the present invention, while removing a top cover therefrom. The optical disc apparatus shown in FIG. 7 corresponds to that combining the first embodiment and the third embodiment, and it comprises the enlarged-diameter cutoff portion 17 and the bypass openings 24.

As was explained in the first embodiment, if forming the enlarged-diameter cutoff portion 17 on the wall portion 5e, then the gap defined between the outer edge of the disc 4 and the wall portion 5e is wide in the arc portion 19, but it is in the configuration of being gently or gradually enlarged/reduced, in the straight-line portion 20a and 20b on both sides thereof. If providing the gap between the outer edge of the disc 4 to be wide, in such a manner, the concentration of flows and the interference between the outer edge of the disc 4 are reduced, when the slip-in flow 22 runs from the outer edge of the disc 4 into the inside of the hill portion 50e and also when the leak-out flow 23 runs out from the inside of the hill portion 50e into the vicinity of the outer edge of the disc 4. Thus, in the periphery of the wall portion 5e, though the flow in the vicinity of the outer edge of the disc 4 is fast, but the disturbance is reduced in the flow by means of the enlarged-diameter cutoff portion 17, as was mentioned above, therefore it is possible to reduce the fluid noises caused due to the disturbance.

Also, as was explained in the third embodiment, if forming the bypass openings 24 on the side surface of the hill portion 50e (i.e., the left side-surface of the tray 5), much of the flow running into the hill portion 50e comes into the bypass flow 25 flowing in the gap on the side surface after passing through the bypass openings 24, and the remaining not coming into the bypass flow 25 becomes the leak-out flow 23 flowing out from the center of the wall portion 5e in the peripheral direction thereof into the downstream side. The bypass flow 25, since it joins with the flow on the outer edge of the disc 4 in the wide range after passing through the gap on the side surface, is lowered down in the possibility of causing the interference with the outer edge of the disc 4. On the other hand, since the leak-out flow 23 is reduced in the amount or volume of flowing thereof by that of the bypass flow 25, then the interference between the outer edge of the disc 4 is reduced comparing with the case where there is no bypass opening 24. In this manner, with the present embodiment, since the disturbance can be reduced in the flows in the periphery of the wall portion 5e, by means of the enlarged-diameter cutoff portion 17 and the bypass openings 24, therefore it is possible to reduce the fluid noises caused due to the disturbance of flows.

Herein, comparing between the functions of reducing the noises by means of the enlarged-diameter cutoff portion 17 and the bypass openings 24, the former aims to reduce the concentration/velocity of the flows, mainly, while escaping the slip-in flow 22 and the leak-out flow 23 into the gap defined by the enlarged-diameter cutoff portion 17. On the other hand, the latter aims to reduce the amount or volume of flowing of the leak-out flow 23 at the downstream side of wall portion 5e, i.e., both are different from each other, in the function thereof. For that reason, if combining the both, it can be considered that there can be obtained an effect, near to a total of those, each being obtainable individually, but without harming the effects of reducing the noises with each other.

Figure 8:
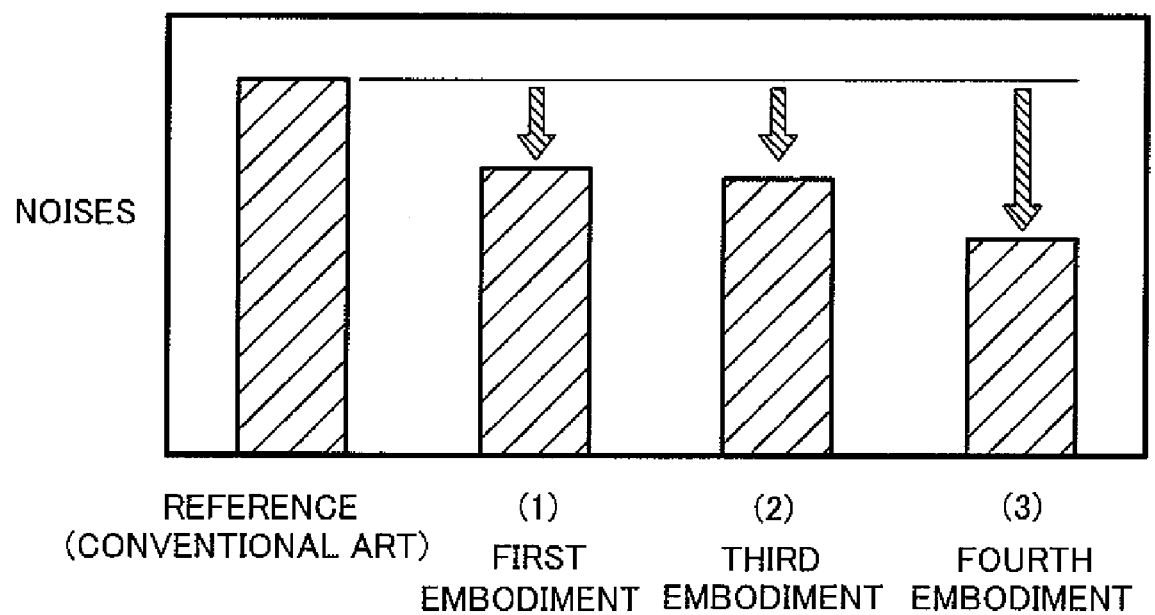
FIG. 8 shows a graph for comparing noises generated within the optical disc apparatuses according to the first, the third and the fourth embodiments of the present invention.

Then, the inventors conduct experiments, for the purpose of confirming the effect of reducing the noises within the optical disc apparatuses according to the first, the third and the fourth embodiments of the present invention. FIG. 8 is a graph for comparing the noises, which are generated within the first, the third and the fourth embodiments of the present invention, respectively.

In the experiments, noises are measured under the condition of rotating the disc at high-speed with respect to the following thin-shaped optical disc apparatuses of the tray-type: (1) providing the enlarged-diameter cutoff portion 17 (i.e., the first embodiment); (2) providing the bypass openings 24 (i.e., the second embodiment); and (3) providing both of them (i.e., the fourth embodiment), respectively, and a result of those measurements is compared with the noises of the conventional optical disc apparatus having no such improving structures therein (as a reference). As a result thereof, as is shown in FIG. 8, it can be seen that, with the provision of the enlarged-diameter cutoff portion 17 or the bypass openings 24, for each, it is possible to obtain the effect of reducing the noises, comparing to that of the conventional one (but, the degree of reducing the noises changes depending on the configurations of the enlarged-diameter cutoff portion 17 and/or the bypass openings 24, such as, sizes thereof, etc.) And, it can be seen that, if applying both, the enlarged-diameter cutoff portion 17 and the bypass openings 24, the noise reduction reached to that near to the total of those, each being obtainable individually, comparing with that of the conventional one. With this, it can be confirmed that the fluid noises accompanying with the disc rotation can be reduced, more effectively, if applying the both, the enlarged-diameter cutoff portion 17 and the bypass openings 24, in common with, as was shown in the fourth embodiment.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An optical disc apparatus, comprising:
    a housing;
    a tray, which is provided to be able to comes in/out into/from said housing freely;
    a unit mechanism, which is provided together with said tray, in one body;
    a turntable, which is provided on said unit mechanism and is configured to support a disc thereon, being rotatable freely;
    a spindle motor, which is configured to turn said turntable;
    a pickup, which is configured to do straight-line motion within said unit mechanism, along a radius direction of said turntable;
    a flat portion, which is formed on said tray, within a range facing to a lower surface of the disc being supported on said turntable; and
    a plural number of hill portions, which are formed on said tray, dispersedly, surrounding said flat portion, and each having a wall portion on side facing to the flat portion, so as to form an arc shape around a rotation center of said turntable, wherein
    an opening portion is provided, to pass said pickup passes therethrough, at least on the wall portion within a hill portion, on the side facing to said flat portion, below which said unit mechanism is disposed, among said plural number of hill portions, and
    at least a part of the wall portion, on which said opening is provided, is stepped back to an outer periphery side of said turntable, comparing to said wall portion of the other hill portions.

2. The optical disc apparatus, as described in the claim 1, wherein
    a bypass opening is provided for discharging an airflow introduced into a side of said tray through said opening, on a side surface of the hill portion, below which said unit mechanism is disposed, and
    said bypass opening is provided at a position higher than said flat portion.

3. The optical disc apparatus, as described in the claim 1, wherein
    a downstream side of said turntable in rotating direction thereof, within the wall portion, on which said opening portion is provided, is stepped back to the outer periphery side of said turntable than said wall portion of said other hill portions.

4. The optical disc apparatus, as described in the claim 1, wherein
    a central portion of the wall portion in the peripheral direction, on which said opening portion is provided, is stepped back to the outer periphery side of said turntable than said wall portion of said other hill portions.

5. The optical disc apparatus, as described in the claim 1, wherein
    both ends of the wall portion in the peripheral direction thereof, on which said opening is provided, are connected up to said other wall portions, in a manner of straight-line, in the radius direction of said turntable.

6. An optical disc apparatus, comprising:
    a housing;
    a tray, which is provided to be able to comes in/out into/from said housing freely;
    a unit mechanism, which is provided together with said tray, in one body;
    a turntable, which is provided on said unit mechanism and is configured to support a disc thereon, being rotatable freely;
    a spindle motor, which is configured to turn said turntable;
    a pickup, which is configured to do straight-line motion within said unit mechanism, along a radius direction of said turntable;
    a flat portion, which is formed on said tray, within a range facing to a reverse surface of the disc being supported on said turntable; and
    a plural number of hill portions, which are formed on said tray, dispersedly, surrounding said flat portion, and each having a wall portion on side facing to the flat portion, so as to form an arc shape around a rotation center of said turntable, wherein an opening portion is provided, to pass said pickup passes therethrough, at least on the wall portion within a hill portion, on the side facing to said flat portion, below which said unit mechanism is disposed, among said plural number of hill portions, and a bypass opening is provided for discharging an airflow introduced into a side of said tray through said opening, on a side surface of the hill portion, below which said unit mechanism is disposed, and said bypass opening is provided at a position higher than said flat portion.

\* \* \* \* \*